April 14, 1964
H. TINT
3,128,765
HYPODERMIC SYRINGE AND DOSE DISPENSER
Filed July 17, 1962
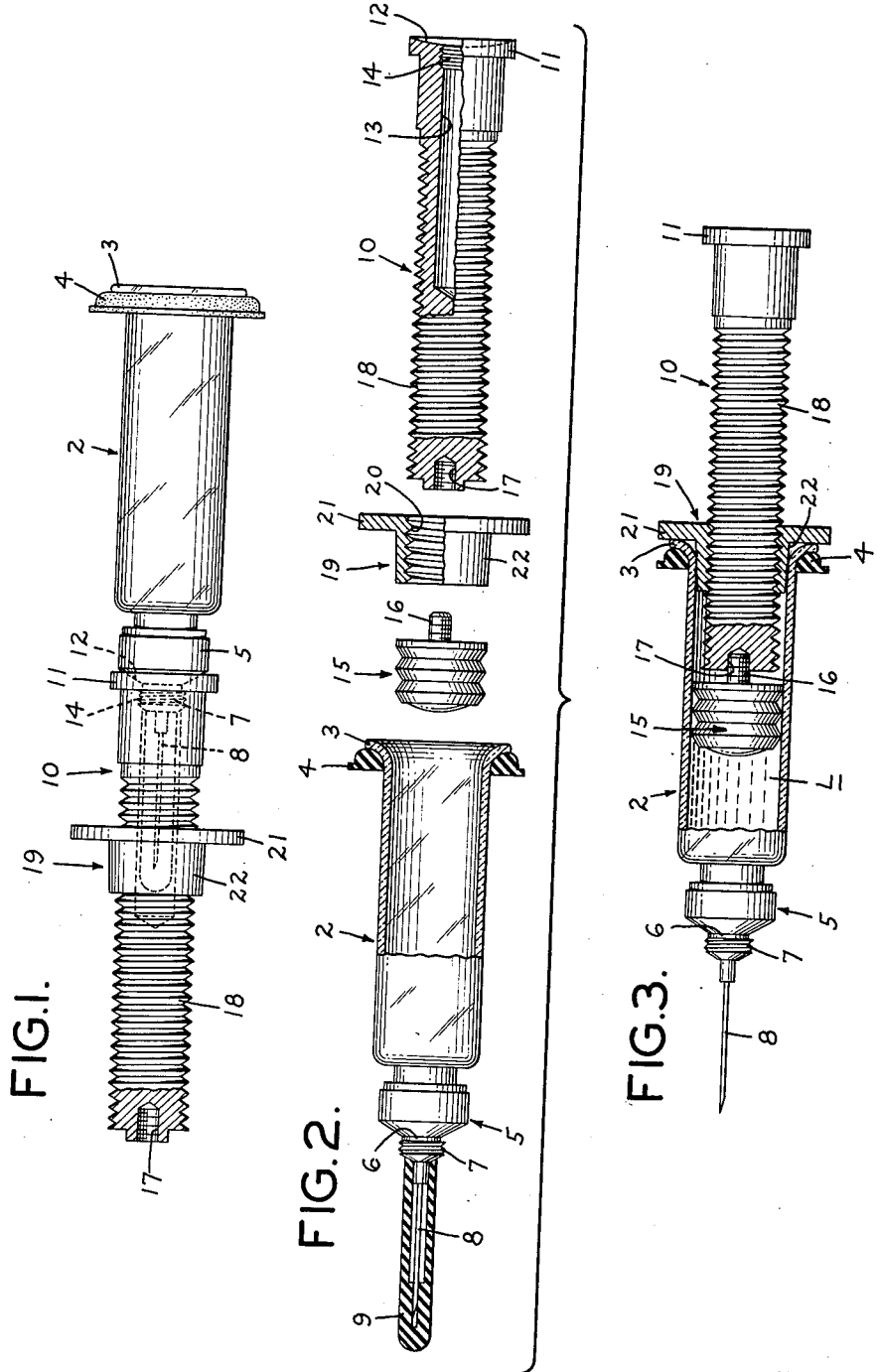
INVENTOR
HOWARD TINT
BY
Andrew Kafko
ATTORNEY United States Patent Office 3,128,765
Patented Apr. 14, 1964

3,128,765
HYPODERMIC SYRINGE AND DOSE DISPENSER
Howard Tint, Havertown, Pa., assignor to American Home Products Corporation, New York, N.Y., a corporation of Delaware
Filed July 17, 1962, Ser. No. 210,426
4 Claims. (Cl. 128—218)

This invention relates generally to an improvement in hypodermic syringes. More particularly, the invention pertains to a modified hypodermic syringe that is alternatively capable of dispensing measured doses of liquid when desired.

Of the many kinds of hypodermic syringes obtainable commercially, those of the type referred to as "cartridge-syringe" units have become widely accepted and used by the medical profession. Said cartridge-syringe unit type generally comprises a transparent cartridge containing an injectable material, a hypodermic needle affixed to one end of the cartridge and a plunger push rod in the other end thereof for forcing the injectable material out of the cartridge and through the needle.

A particular type of cartridge-syringe unit that has attained most widespread acceptance is described and claimed in U.S. Patent 2,671,449 and comprises generally a transparent cartridge which has a sealing hub affixed at the proximal end thereof, the hub mounting a hypodermic needle in communication with the interior of the cartridge and having a male thread thereon for a purpose referred to hereinafter, the distal end of the cartridge having a flared opening surrounded by an annular rubber finger-piece, and a slidable plunger within the cartridge having a male screw-threaded extension directed toward said distal end. A combination needle cover and plunger push rod is provided which has at one end thereof a comparatively large internal bore having an internally threaded region adjacent said end, said threaded region being adapted for mating with the male thread on the hub affixed to the cartridge, whereby the plunger push rod is attachable to said hub in covering relationship over the needle when the device is shipped, stored, or otherwise not in actual use. The combination needle cover and plunger push rod is provided at its other end with a much smaller internal bore which is also provided with a female thread which, in this case, is adapted for mating with the male thread on the extension of the plunger in the cartridge.

In the use of the hypodermic spyringe just described, the combination needle cover and plunger push rod is unscrewed from the threaded hub of the cartridge to uncover the needle affixed thereto; and then the end of said rod in which the plunger screw mating internal bore is located is inserted into the flared opening of the cartridge to engage the screw-threaded extension on the plunger therein to which the rod is attached by rotation. In the usual operation of such device, the user grasps the device with his fingers beneath the finger piece and his thumb on the protruding end of the plunger rod which may then be pressed to eject the liquid from the cartridge through the needle. The cartridge-syringe units just described are well recognized as admirably adapted for their intended use which is to inject through the hypodermic needle either the full liquid charge contained in the cartridge or an unmeasured part thereof, and are obtainable commercially from Wyeth Laboratories under the "Tubex" trademark.

Under certain circumstances, as for example, when a medicament is particularly potent per small unit of volume, or for any other reason, it may be desirable to be able, alternatively, to dispense an accurately measured small dose of such or other medicament. Certain specialized devices have been developed for this particular purpose and in some instances may comprise modified structures that can perform this dose dispensing function in addition to the usual gross hypodermic injection function of the now conventional cartridge-syringe unit. However, in these known modified structures, the plunger push rod and dose dispensing mechanism is, in effect, permanently affixed to the distal end of the cartridge and in no case is the plunger push rod adaptable for alternative use as a needle cover by the simple expedient of mounting the push rod on the hub of the cartridge at the proximal end thereof.

Accordingly, it is the primary object of the present invention to provide a hypodermic syringe, of the type having a needle cover that is alternatively usable as the plunger push rod for the syringe when in use, with a dose dispensing structure, whereby the device may perform either the usual hypodermic injection function or an accurately measurable dose-dispensing function as desired.

It is another object of this invention to provide a hypodermic syringe and dose dispenser of the kind referred to above wherein a comparatively simple modification of the known structure of the combination needle cover and plunger rod alone suffices to permit, alternatively, hypodermic syringe injection of an accurately measured dose dispensing in facile manner without involvement of interference with either function because of the presence of the modifying structure.

Another object of the invention is to provide a hypodermic syringe and dose dispenser as described wherein simple but effective locking means are provided for securing the plunger rod mounting structure to the distal end of the device when the dose dispensing operation is to be performed and for disconnecting the same parts when a conventional syringe function is required or the device is to be assembled for storing.

The above and other objects and advantages of the invention will appear from a better understanding thereof upon reference to the description that follows.

Generally, the invention resides in a cartridge-unit device comprising: a cartridge having an opening at its distal end; an injection needle; means sealing the proximal end of said cartridge and mounting said injection needle thereon in communication with the interior of said cartridge; a plunger mounted within said cartridge for reciprocation therein, said plunger having connecting means thereon accessible via the opening in said distal end of said cartridge; an elongate cover for said needle, said elongate cover having means at one end thereof for mounting the latter on said device in covering relationship with respect to said needle, said needle cover having at the other end thereof connecting means connectable with said connecting means of said plunger for affixing said cover to said plunger whereby the former is adapted to serve alternatively as a push-rod for said plunger when the device is used for injection; a seating member movably mounted on the exterior surface of said combined needle cover and push-rod, means on said surface to permit relative axial incremental movement between said seating member and said combined cover and push-rod, said seating member being provided with means for maintaining said member within the opening in said distal end of said cartridge in substantially non-rotatable relationship with said cartridge whereby said combined cover and push-rod is adapted to serve alternatively as a dose-dispensing actuator upon rotation of said combined cover and rod with respect to said seating member. Preferably, coactive means are provided on said cartridge and said seating member whereby when said seating member is seated within the opening at said distal end of said cartridge, said coactive means may be grasped by one hand of the operator to retain said relationship of said seating member within said cartridge during incremental axial advancement of said push rod in said seating member by rotation of said rod during a dose-dispensing operation.

A preferred embodiment of the device, in accordance with the present invention and as an illustration thereof, is now described below with reference to the drawings wherein:

FIG. 1 is a side elevation of a hypodermic syringe assembled for shipment and/or storage, wherein the novel combined needle cover and plunger push rod with dose-dispensing structure is positioned in needle covering relationship with the needle;

FIG. 2 is a similar side elevation of the device shown in FIG. 1, but with the combined needle cover and push rod removed from needle covering relationship on the syringe (the needle sheath shown still remaining), and positioned for insertion into the open distal end of the cartridge for its push rod and dose-dispensing function after attachment to the plunger; the separable parts including the plunger and annular sleeve member being shown in exploded relationship and in partial section to illustrate the interior structures thereof; and FIG. 3 is another side elevation of the same device shown in FIGS. 1 and 2, but with the various parts assembled for performing a measured dose-dispensing operation; the cartridge, fingerpiece thereon, and proximal end of the plunger all being in partial section, and the needle sheath removed.

Referring to the drawings, the hypodermic syringe and dose-dispenser device of the present invention, shown as packaged for shipment and/or storing in FIG. 1, comprises a transparent cartridge 2 having a flared distal end 3 surrounded by an annular rubber finger-piece 4. The proximal end of cartridge 2 is sealed by means comprising a hub 5 which has, on a narrower shank 6 thereof, a male thread 7. Secured by means of said hub 8, in communication with the interior of cartridge 2, is a hypodermic needle 8. Needle 8, when not in use, is provided with the usual needle sheath 9. A combined needle cover and plunger push rod 10 is provided with a distally located enlarged portion 11 with a slight recess 12 and internal bore 13 having an internally threaded region 14 which, as indicated in FIG. 1, may mate with the thread 7 on hub shank 6 whereby the enlarged portion 11 of needle cover 10 engages hub 5. Positioned within cartridge 2, for axial reciprocation therein, is a plunger 15 which, on its surface facing toward the distal open end of cartridge 2, has a screw-threaded extension 16. Combined needle cover and plunger push rod 10 has at its proximal end a plunger screw-mating internal bore 17 by which rod 10 and plunger 15 are connectable as shown in FIG. 3. The structure so far described is similar to the prior art cartridge-syringe units disclosed in USP 2,671,449 referred to hereinbefore.

In accordance with the present invention, the combined needle cover and plunger push rod 10 is provided over the major portion of its surface with an external thread 18 on which a sleeve 19 is rotatably mounted by means of its internally mating thread 20, whereby axial rotation of plunger push rod 10 relative to sleeve 19 may cause relative axi-positional displacement of said parts. Sleeve 19 is also provided with a radial flange 21 and a gently frusto-conical surface 22 for the purposes that will appear hereinafter.

As referred to previously, the hypodermic syringe and dose-dispensing device described, when shipped, stored, or otherwise not in use, is assembled with combined needle cover and push rod 10 screw-threadedly mounted on shank 6 of hub 5 in needle covering relationship to needle 8 (and sheath 9) as illustrated in FIG. 1, and with plunger 15 frictionally engaged within cartridge 2 against the liquid L that may be provided in the cartridge as supplied to the user (see FIG. 3). Maintenance of the position of plunger 15 within cartridge 2 as described is augmented by atmospheric pressure bearing on the exposed surface of the plunger, at least as long as sheath 9 functions to seal hypodermic needle 8.

When the device is to be prepared for use, the combination needle cover and plunger push rod 10 is unscrewed from shank 6 of hub 5 and is removed to uncover sheathed needle 8. The end of rod 10 provided with the internally threaded bore 17 is then inserted into the open distal end of cartridge 2 and is connected to male threaded shank 16 of plunger 15 by rotation, as is conventional with this general type of cartridge-syringe unit exemplified by the aforesaid USP 2,671,449.

If the device is to be used for a conventional hypodermic injection; as in the usual operation of such devices generally for said purpose, the user grasps cartridge 2 with the fingers of one hand beneath finger-piece 4 and the thumb on the recessed end 12 of plunger rod 10 which (after removal of sheath 9 from needle 8) may then be pushed into cartridge 2 (and with it plunger 15) for ejecting the liquid L out of cartridge 2 and through needle 8. Prior to this operation, as is well known in the art, plunger 15 may be reciprocated within cartridge 2 by axial manipulation of push rod 10 to permit aspiration or reconstitution of the liquid L therein, or, in certain instances, to take up liquid initially for charging the cartridge. As will appear, prior to an injecting or other inward stroke of plunger rod 10 of the device of the present invention, however, sleeve 19 may have to be rotated on rod 10 to position the former on the latter toward the distal end thereof so as not to restrict the required inward stroke of rod 10 by premature abutment of sleeve 19 against the flared end 3 of cartridge 2.

When use is to be made of the device of the present invention in a dose-dispensing operation, combined cover and rod 10 is obviously removed from shank 6 of hub 5 as before and similarly attached to plunger 15. In this case, however, sleeve 19 is rotated on rod 10 to cause the former to be positioned with its frusto-conical surface 22 abutting within the flared inner distal end 3 of cartridge 2. Due to the frusto-conical configuration of surface 22 of sleeve 19, the latter tends to lock against rotation within said flared end when fitted tightly therewithin. In the present instance, the tight fit is achieved when the cartridge-syringe unit is held in one hand of the user by grasping the upper surface of flanged portion 21 of sleeve 19 and the lower surface of finger-piece 4 (FIG. 3) and urging said parts together. With sleeve 19 and flared end 3 of cartridge 2 held in tight abutment in one hand as described, plunger push rod 10 may then be rotated within said sleeve by the other hand to dispense the liquid contained in cartridge 2 in measured dose units. Merely by way of example, in the device of the type disclosed, one quarter rotation of rod 10 dispenses one drop of liquid.

It will of course be understood that although a specific and preferred embodiment of the invention has been described above in detail, many changes and modifications may be made and said invention embodied in widely differing forms without departing from the spirit and scope thereof, in its broader aspects coming within the language or scope of any one or more of the appended claims. Merely by way of example, the several parts may be made of various materials, such as glass, plastics or metals; in certain applications, the cartridge need not be transparent nor need the dispensing orifice be a needle; screw threads may be replaced by other connecting structures; the abutting surfaces of the sleeve and/or cartridge end may be modified in configuration; mechanical structures such as gaskets, seals, clamps, or other securing devices may be employed to augment the sealing or non-rotative relationship between the cartridge end and the annular seating member; the seating member movably mounted on the combined cover and push-rod need not be annular; for example, the member may be in the form of a partial ring, horseshoe or other discontinuous shape, whereby the discontinuity may permit mounting of the member on the rod by lateral application, as by snapping of the former on the latter, instead of by threading the former on the latter as normally required with an annular member; etc.

I claim:
1. A cartridge-syringe unit device adapted for selective gross-ejection and incremental dose-dispensing, said device comprising:
  (1) a cartridge having an opening at its distal end;
  (2) an ejection member;
  (3) means sealing the proximal end of said cartridge and mounting said ejection member thereon in communication with the interior of said cartridge;
  (4) a plunger mounted within said cartridge for reciprocation therein, said plunger having connecting means thereon accessible via the opening in said distal end of said cartridge;
  (5) an elongate cover for said ejection member, said elongate cover having means at one end thereof for mounting the latter on said device in covering relationship with respect to said member, said cover having at the other end thereof connecting means connectable with said connecting means of said plunger for affixing said cover to said plunger whereby the former is adapted to serve as a push-rod for said plunger when the device is to be used;
  (6) a seating member movably mounted on the exterior surface of said combined cover and push-rod, means on said surface to permit relative axial incremental movement between said seating member and said combined cover and push-rod, said seating member being provided with means for selectively maintaining said member within the opening in said distal end of said cartridge in substantially non-rotatable relationship with said cartridge whereby said combined cover and push-rod is adapted to serve as a dose-dispensing actuator upon rotation of said combined cover and rod with respect to said seating member, said seating member also being selectively removable from the opening in said distal end of said cartridge whereby said member may be moved on said surface of said combined cover and push-rod toward the distal end thereof without causing reciprocation of said plunger in said cartridge thereby to adapt said combined cover and push-rod to serve as a gross-ejection actuator upon axial movement thereof into said cartridge.

2. A cartridge-syringe unit device as claimed in claim 1 wherein said cartridge and said seating member are provided with coacting means for applying clamping pressure therebetween.

3. A cartridge-syringe unit device adapted for selective gross-ejection and incremental dose-dispensing, said device comprising:
  (1) a generally cylindrical cartridge having means forming an opening at its distal end;
  (2) a dispensing needle;
  (3) hub means sealing the proximal end of said cartridge and mounting said dispensing needle thereon in communication wtih the interior of said cartridge;
  (4) a plunger mounted within said cartridge for reciprocation therein, said plunger having connecting means thereon accessible via the opening in said distal end of said cartridge;
  (5) an elongate cover having an axial bore at one end thereof for receiving said needle when said cover is mounted on said device in covering relationship with respect to said needle, coactive securing means on said cover and said device for removably affixing the former to the latter in said relationship, said needle cover having over the major portion of the exterior surface thereof, a male screw thread, and said needle cover also having at the other end thereof connecting means connectable with said connecting means of said plunger for removably affixing said cover to said plunger whereby the former is adapted to serve alternatively as a push-rod for said plunger when the device is to be used;
  (6) an annular member having an internally screw-threaded bore for mating with said male screw thread on said exterior surface of said cover, whereby said annular member is rotatably mountable on said surface to permit relative axial incremental movement between said annular member and said combined cover and push-rod upon relative rotation between said cover and rod, said annular member being provided with means for selectively seating said member within the opening in said distal end of said cartridge, and with means for maintaining said seating of said member in substantially non-rotatable relationship with said cartridge, whereby said combined cover and push-rod is adapted to serve alternatively as a dose-dispensing actuator upon rotation of said combined cover and rod with respect to said annular member, said annular member also being selectively removable from the opening in the distal end of said cartridge whereby said annular member may be moved on said surface of said combined cover and push-rod toward the distal end thereof without causing reciprocation of said plunger in said cartridge thereby to adapt said cover and said push-rod to serve as a gross-ejection actuator upon axial movement thereof into said cartridge.

4. A cartridge-syringe unit device adapted for selective gross-ejection and incremental dose-dispensing, said device comprising:
  (1) a cylindrical transparent cartridge having an opening at its distal end defined by a flared lip, and an annular fingerpiece mounted on said end of said cartridge and retained thereon ajacent said flared lip;
  (2) an injection needle having a removable sheath mounted thereon;
  (3) a hub sealing the proximal end of said cartridge and having a first externally threaded shank mounting said injection needle thereon in communication with the interior of said cartridge;
  (4) a plunger mounted within said cartridge for reciprocation therein, said plunger having a second externally threaded shank extending toward said distal end of said cartridge and being accessible via said flared opening in said cartridge;
  (5) an elongate cover for said needle, said elongate cover having an axially disposed large bore at one end thereof adapted to encase said sheathed needle, said cover having within said large bore a first internal thread complementary to the external thread of said first shank whereby said cover is adapted to be attached to said first shank in covering relationship with respect to said sheathed needle, said needle cover having at the other end thereof a smaller bore provided with a second internal thread complementary to the external thread of said second shank whereby said cover is adapted to be attached to said plunger and to serve as a push-rod for said plunger when the device is to be used for injection, said elongate cover having a continuous screw thread on a major portion of the exterior surface thereof;
  (6) an annular member having an internal thread complementary to said continuous screw thread on said cover, said annular member being mounted by said complementary threads on said cover whereby relative rotation between said annular member and cover causes relative axial incremental displacement between said annular member and said combined cover and push-rod, said annular member having a frusto-conical surface that selectively fits at its narrower end within the opening in said flared distal end of said cartridge, said annular member having a radial flange at its wider end whereby the user, with one hand, may clamp said flange and said fingerpiece towards each other to maintain said annular member in non-rotatable relationship with said cartridge whereby said combined cover and push-rod is adapted to serve as a dose-dispensing actuator upon rotation, with the other hand of the user, of said combined cover and rod with respect to said annular member, said annular member also being selectively removable from the opening in said flared distal end of said cartridge whereby said annular member may be moved on said complementary threads of said combined cover and push-rod toward the distal end thereof without causing reciprocation of said plunger in said cartridge thereby to adapt said combined cover and push-rod to serve as a gross-ejection actuator upon axial movement thereof into said cartridge.

References Cited in the file of this patent

UNITED STATES PATENTS

| | | |
|---|---|---|
| 2,648,334 | Brown et al. | Aug. 11, 1953 |
| 2,671,449 | Dann | Mar. 9, 1954 |
| 2,736,315 | Feeney | Feb. 28, 1956 |
| 2,882,899 | Nogier et al. | Apr. 21, 1959 |

FOREIGN PATENTS

| | | |
|---|---|---|
| 370,878 | France | Jan. 5, 1907 |
| 224,512 | Switzerland | July 16, 1943 |